United States Patent Office 2,769,456
Patented Nov. 6, 1956

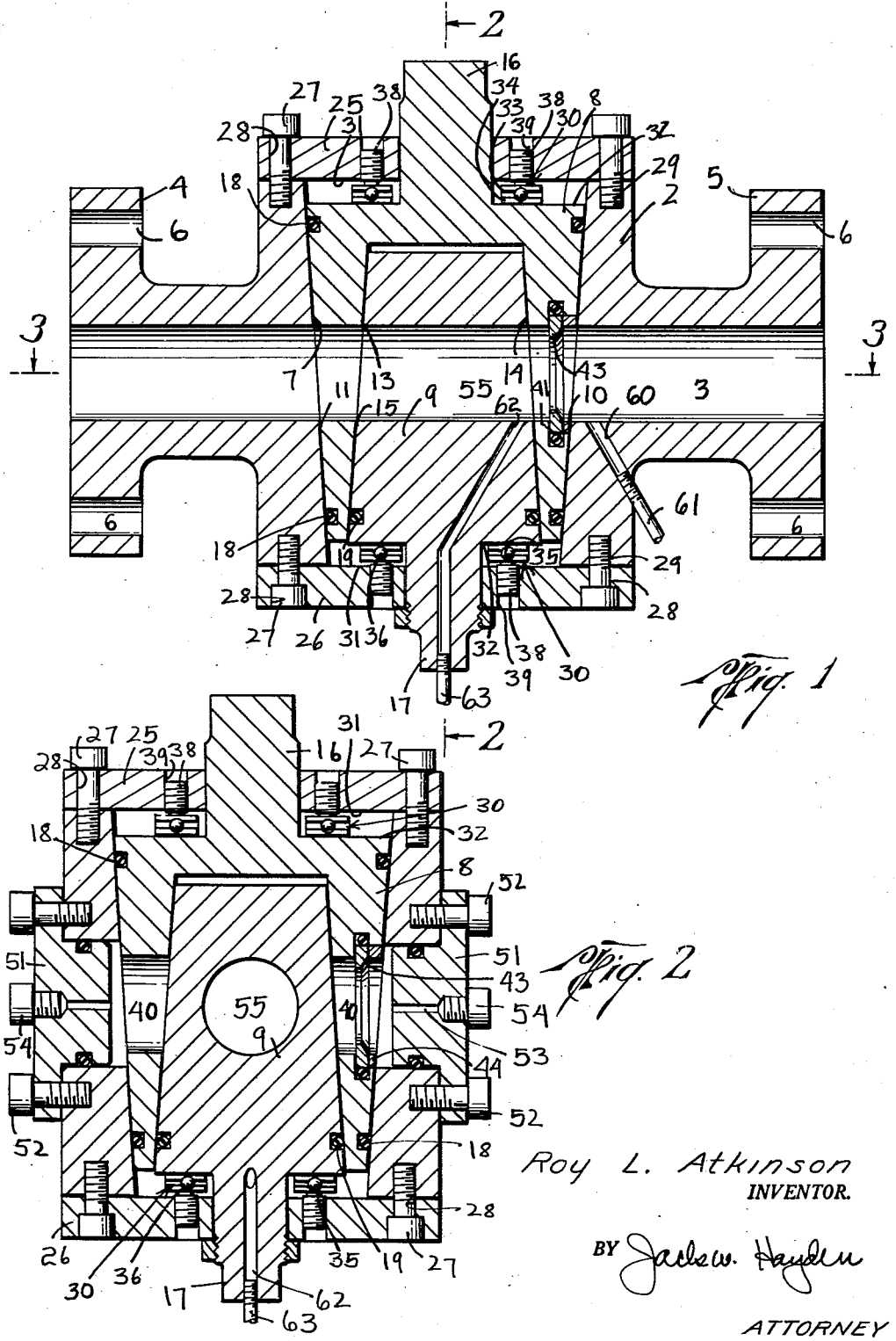

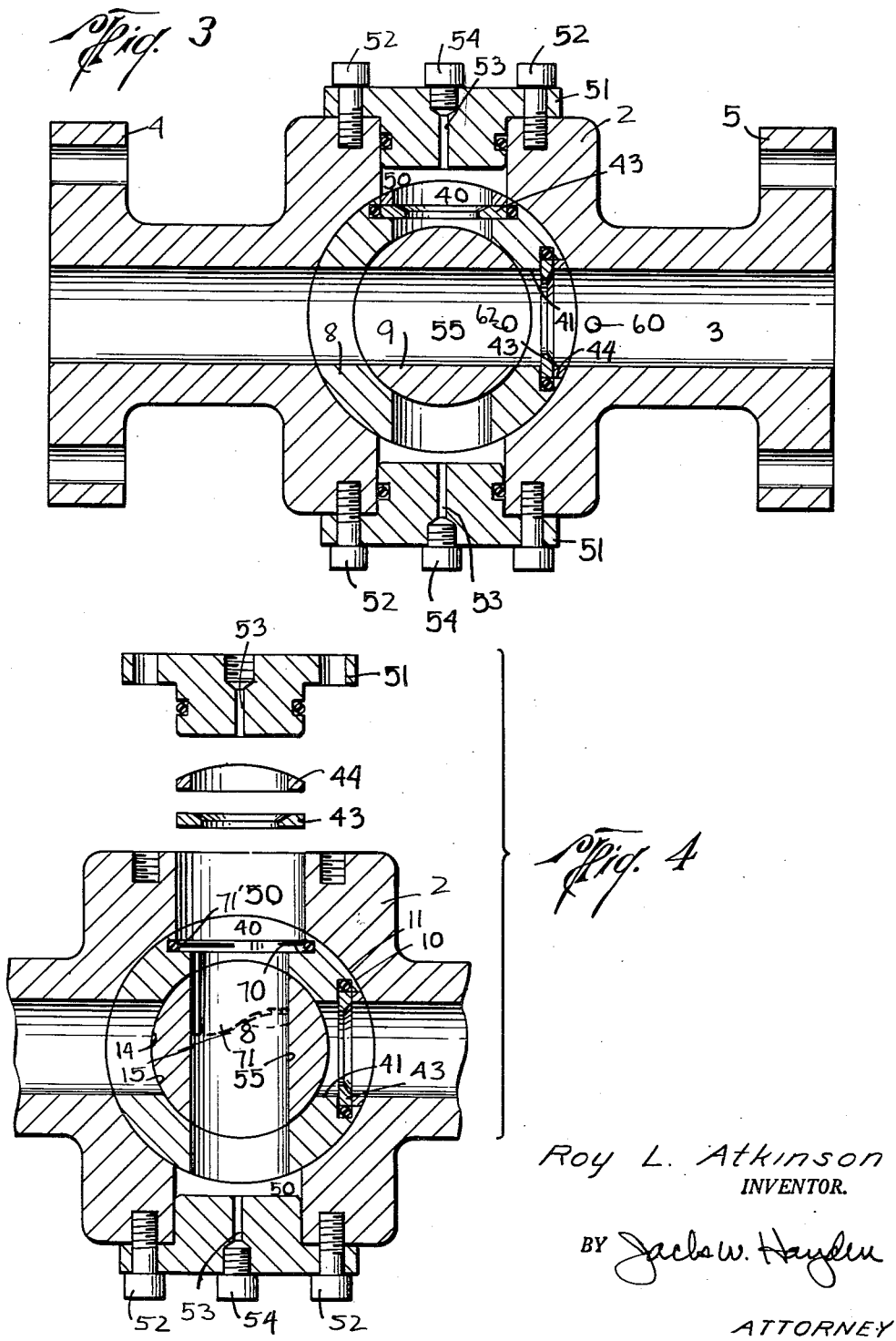

2,769,456

COMBINATION PLUG VALVE AND ORIFICE HOUSING

Roy L. Atkinson, Pasadena, Tex.

Application July 12, 1955, Serial No. 521,480

5 Claims. (Cl. 137—268)

The present invention relates to a device which may be used as a combination plug valve and orifice housing.

In order to determine the fluid flow rate in a flow line, an orifice may be positioned therein whereby the volume flow rate in the line may be measured. When the orifice becomes worn it is necessary that it be replaced, and with structures presently used, this generally necessitates that flow through the line be cut off while the orifice member therein is being replaced or removed.

The present invention provides an orifice housing which is provided with at least two orifice members so that while one is in position in the flow line, the other may be in a position so that it can be changed or repaired without cutting off flow through the flow line.

Another object of the invention is to provide a combination plug valve and an orifice housing including a body with a flow passage therethrough, inner and outer telescoping plugs intersecting the flow passage and having flow ports which communicate with the flow passage.

Still another object of the present invention is to provide a combination plug valve and an orifice housing including a body with a flow passage therethrough, inner and outer telescoping plugs intersecting the flow passage and having flow ports which communicate with the flow passage, each of said plugs having a stem whereby such plugs may be rotated relative to each other and relative to the body.

Still a further object of the invention is to provide a body for mounting in a flow line, which body has a flow passage therethrough, a pair of concentrically arranged telescoping plugs fitting within the body and intersecting the flow passage therethrough with stem means on each of the plugs whereby they may be rotated relative to and independently of each other and relative to the body.

Still a further object of the invention is to provide a body for mounting in a flow line, which body has a flow passage therethrough, a pair of concentrically arranged telescoping inner and outer plugs fitting within the body and intersecting the flow passage therethrough with stem means on each of the plugs whereby they may be rotated relative to and independently of each other and relative to the body, there being a passage through said inner plug, and there being passages or ports through said outer plug intersecting at substantially right angles and adapted to communicate with said body flow passage, the outer of said paired plugs having an orifice member in each of its passages and at right angles to each other in the flow ports or passages through the plug so that at least one of said orifices may be positioned in the flow line of said body by rotation of the outer plug.

Still a further object of the invention is to provide a body for mounting in a flow line, which body has a flow passage therethrough, a pair of concentrically arranged telescoping inner and outer plugs fitting within the body and intersecting the flow passage therethrough, stem means on each of the plugs whereby they may be rotated relative to and independently of each other and relative to the body, there being a passage through said inner plug, and there being passages or ports through said outer plug intersecting at substantially right angles and adapted to communicate with said body flow passage, the outer of said paired plugs having an orifice member in each of its passages and at right angles to each other in the flow ports or passages through the plug so that at least one of said orifices may be positioned in the flow line of said body by rotation of the plug, and there being pressure take off ports in the device whereby the pressure differential across the orifice may be determined.

Yet a further object of the invention is to provide a body having a flow passage therethrough with a pair of inner and outer concentrically arranged telescoping plugs fitting in the body and intersecting the passage, seal means between the outer plug and the body and seal means between the inner plug and the outer plug for inhibiting leakage of fluid between said plugs and said body and said plugs having ports therethrough which are adapted to communicate with the flow passage through the body, said plugs each having a stem whereby the plugs may be rotated independently of each other and relative to the body.

Still another object of the invention is to provide a device which serves as a combination plug valve and orifice support wherein the plug valve cooperates with the orifice support so that the orifice members in the support may be changed without cutting off the flow through the orifices or through the plug.

Yet a further object of the invention is to provide a combination plug valve and orifice support wherein at least two orifice members are mounted in the support, the portion of the device which acts as a plug or valve to shut off flow through the device cooperating with the orifice support so that the orifices may be changed or repaired without cutting off flow through the device.

Other objects and advantages of the invention will become more readily apparent from a consideration of the following description and drawings wherein:

Fig. 1 is a sectional view of the invention illustrating the plugs in position in the body of the device with caps mounted on the body over each of the plugs for maintaining them in position in the body;

Fig. 2 is a vertical sectional view on the line 2—2 of Fig. 1 illustrating the access openings in the body of the device and the closure members therefor;

Fig. 3 is a horizontal sectional view on the line 3—3 of Fig. 1 showing in more detail the arrangement of the orifice members in the outer plug or support and the closure caps for the access openings in the body of the device; and Fig. 4 is a partial sectional view somewhat similar to Fig. 3 but showing a portion of the device in exploded arrangement so as to more clearly illustrate the structural arrangement thereof.

In Fig. 1 the body of the device is illustrated at 2 and is shown as being provided with an aperture 3 or flow passage which extends longitudinally through the body for conducting fluid therethrough. The device may be connected into a flow line by any suitable means and in the form of such means illustrated in the drawings, flanges 4 and 5 are provided at each end of the body whereby bolts (not shown) may be secured through openings 6 in the flanges and through openings in an adjacent flange in the flow line (not shown) so as to securely position the device in the flow line. Substantially mid-way of the aperture 3, the body 2 is provided with an enlarged opening 7 for accommodating the plugs 8 and 9, which plugs intersect the flow passage 3 in the body 2. It is to be noted that the inner wall surface 10 of the opening 7 is tapered from the top to the bottom thereof as illustrated in Fig. 1 of the drawings and the outer surface 11 of the plug 8 is provided with a mating taper so as to closely and slidably fit against the surface 10 of opening 7.

The plug 9 is telescopically fitted within the recess or counterbore 13 of the plug 8, such recess or counterbore being provided with a tapered peripheral wall 14 which tapers in a direction opposite to the taper on the wall 10 of opening 7. The plug 9 has a mating taper on its outer surface 15 so that it snugly fits within the recess 13.

The plugs 8 and 9 are concentrically arranged relative to each other in the body 2 and are each provided with a stem 16 and 17 respectively, whereby they may be rotated relative to and independently of each other and may be rotated relative to the body 2 as desired, and to be more fully described hereinafter.

The plug 8 may be provided with suitable seal means as illustrated at 18 above and below the aperture or passage 3 so as to inhibit leakage of fluid therefrom and between the plug 8 and the body 2. Seal means 19 may be provided on the inner plug 9 so as to inhibit leakage of fluid from the passage 3 and between the inner plug 9 and outer plug 8. The seal means 18 and 19 may be of the O-ring type and will extend completely around the plugs 8 and 9 respectively so as to form a seal between the walls 10 and 11 of opening 7 and plug 9 respectively. Similarly, the seal 19 forms a seal between the walls 14 and 15 of recess 13 and plug 8 respectively. Such seals allow free relative rotational movement between the plugs and the valve body whereby the plugs may be moved to any desired relative rotated position, but will maintain a fluid seal between the plugs and between the body 2 so as to inhibit leakage of fluid from the body passage or aperture 3 as fluid flow occurs therein.

Caps 25 and 26 are arranged on each end of the opening 7 so as to abut the plugs 8 and 9 respectively and to maintain them in position within the body 2. Such caps may be removably secured to the body 2 by any suitable means such as the bolts 27 which are adapted to engage through the openings 28 in the caps and into threaded openings 29 of the body 2. In order to position the plugs 8 and 9 laterally relative to the body passage 3 and in order to maintain the plugs in a proper telescoped relationship while permitting free rotational movement thereof, suitable ball bearing spacing means 30 may be provided.

The ball bearing spacing means 30 is adapted to fit between the inner surface 31 of each of the caps and the adjacent surface 32 of each of the plugs 8 and 9. The ball bearing spacing means includes plates 33 and 34 which are provided with mating grooves 35 for receiving the ball bearings 36 therein. After the plugs 8 and 9 have been positioned within the body 2 of the device and the caps 25 and 26 positioned on the opening 7 at each end thereof, Allen screws 38 may be threaded through openings 39 in each of the caps 25 and 26 so as to abut the top plate 33 of the ball bearing spacing means 30. This positions the ball bearing spacing means 30 firmly against the adjacent surface 32 of the plugs 8 and 9 and prevents relative longitudinal movement between the plugs and between the plugs and the body 2 after the device has been assembled.

The construction of the outer plug 8 is more clearly illustrated in Fig. 3 of the drawings and is shown as including flow passages 40 and 41 which intersect at substantially right angles within the plug. Each of such passages or ports is provided with an orifice 43. Each orifice 43 is positioned within the passages in the plug 9 by means of a retainer ring 44 which abuts against the orifice 43. The retainer ring 44 may be engaged within the end of the passages 40 and 41 in plug 8 by any suitable means such as cooperating threaded surfaces on the periphery of the ring and in the passages, which cooperating threaded surfaces may be of any conventional type and are not shown in detail in the drawings.

It is to be noted that the construction of the plug 9 permits one orifice on plug 8 to always be positioned in the flow passage 3 of the body while the other orifice on the plug is in a "stand by" position within the recess or opening 50 of the body 2. The opening 50 extends completely through the body 2 of the device and is covered by the cap 51 at each end which may be secured on the body by means of the bolts 52. An opening 53 is provided in the caps 51 which opening is closed at its outer end by the bolt 54 whereby fluid pressure within the opening 50 may be bled off prior to removal of either of the caps 51 to avoid the possibility of injury due to the accumulation of pressure within the recess 50 which might tend to blow the cap 51 off the body 2 as it is removed from engagement with the body 2.

The openings 50 provide a means of access to the outer plug 8 as well as the inner plug 9 and as shown in Figs. 3 and 4 of the drawings, the cap 51 may be removed so as to gain access to the orifice 53 within the opening 50 whereby it may be replaced or repaired as desired. This is particularly advantageous because such construction permits the remaining orifice 53 to stay in position as illustrated in Fig. 3 so that fluid flow through the body 2 of the device need not be cut off while one of the orifice members is being repaired or replaced. The inner plug 9 cooperates in that it seals off the opening 50 from communication with the aperture or flow passage 3 in the body 2 and thereby permits access through the opening 50 to the orifice 53 which is in "stand by" position and out of communication with the flow passage 3. The inner plug 9 is provided with a port or flow passage 55 which is adapted to be communicated with either the port 40 or 41 of the plug 8 as desired.

In Fig. 3, the passage 55 is shown as being communicated with the body flow passage 3 and port or passage 41 in plug 8 so that fluid flow through body 2 of the device may be effected. As previously mentioned, when the plug 8 and the plug 9 is in this position, the orifice 53 in opening 50 may be changed or replaced, if desired, and fluid flow will continue during such operation.

If for any reason, it is desired to shut off flow through the body 2, the plug 8 may be rotated to the position shown in Fig. 4 at which time communication between the passage 3 from one end of the body to the other is interrupted by means of the plug 8.

A great deal of difficulty has been heretofore encountered in providing pressure take off arrangements in orifice meters or orifice arrangements such as described herein. The present invention not only provides an interchangeable orifice construction, but an interchangeable orifice construction wherein the pressure upstream and downstream in the flow passage of the body and relative to the orifice in such flow passage may be conducted exteriorly of the device for instrumentally determining or cutting the pressure differential across the orifice so as to indicate the flow rate through the device 2.

As shown in Fig. 1 of the drawings, an opening 60 is provided in the body 2 and upstream relative to the orifice 53 positioned in the passage 3 so that the fluid pressure in the body passage 3 may be conducted through the conduit 61 exteriorly of the body 2 and compared with the downstream pressure obtained through opening 62 in plug 8 and extending therethrough to connect with conduit 63. It is to be noted that this construction provides a plug arrangement wherein the plugs are movable relative to each other so as to position them as desired within the body 2 while still obtaining upstream and downstream pressure readings regardless of which orifice member in plug 8 is positioned to communicate with the flow passage 3 of body 2.

From the foregoing description, it can be appreciated that a device is provided wherein a combination plug valve and orifice housing or support is provided.

When the plugs 8 and 9 are positioned so that the opening 55 in plug 9 is aligned with the flow passage 3 in the body 2, fluid flow through the device will occur. The plug 9, upon rotation either to the right or left by means of its stem 17 can be positioned so that the passage 55 therethrough is not in communication with the passage 3 in the body 2 and this serves to shut off flow through the device. This position is illustrated in Fig. 4 of the drawings.

If it should be desired to change either of the orifice members 43 in passage 40 or passage 41 of plug 8, the plug can be rotated by its stem so as to position either passage 40 or passage 41 in communication with access passage or opening 50. Bleed screw 54 may be unscrewed so as to permit the accumulation of any pressure in opening 50 to pass outwardly through passage 53. The cap 51 may then be removed so that access may be had to the retainer ring 44 for removal thereof which in turn allows the orifice plate 43 to be removed or replaced. During such operation, plugs 8 and 9 cooperate to continue flow through body passage 3. It is to be noted that pressure take-off passages 60 and 62 which communicate with the flow passage 3 upstream and downstream respectively of the orifice plate 43 conduct the fluid pressure at such points exteriorly of the body 2 of the device where the pressure differential of such points may be readily determined. Since the downstream passage or port 62 is in plug 9 it will serve as a pressure take off means for either passage 40 or 41 whichever is in alignment with body passage 3 so as to communicate therewith.

It is desirable from time to time to remove accumulated, solidified paraffin from the flow line and the present invention provides a means whereby a soluble solvent material may be injected into the flow line with a minimum of effort. The solvent upon dissolving in the flow line acts to dissolve the accumulated paraffin.

By rotating the plug 9 to the position illustrated in Fig. 4 of the drawings so that the opening 55 therein communicates with the access opening 50 in the body 2 of the device, access may be had to the opening 55 by removing cap 51 so that a soluble plug of solvent for dissolving paraffin from the flow line may be positioned in the opening 55 of plug 9.

The cap 51 may then be repositioned over the opening 50 and the plug then rotated so as to communicate opening 55 therethrough with flow passage 3. The plug of soluble material is thereby positioned in the flow line and the medium passing therethrough will push the plug of material along the line, gradually dissolving it as it moves. The solvent plug will act to dissolve the solidified paraffin in the flow line and the operation may be repeated when and as necessary.

It is desirable from time to time to provide a modified form of orifice, termed a flow choke, in the flow line for regulating or controlling the amount of fluid flow. The present invention provides a device wherein a choke may be easily and quickly positioned within the flow line and which may be removed therefrom or replaced with a minimum of effort.

Any conventional form of flow choke may be provided and used in the invention. It will, of course, have an annular flange for seating on the surface 70 and will be of a size so that when the retainer ring 44 is threaded into position, such ring will abut against the flange and hold the choke in position.

One suitable form of choke is illustrated in dotted line of Fig. 4 of the drawings. An annular flange 71' is integrally connected with the tubular body 71, which body will extend all the way through passage 55 of plug 8 and into the opposite end of port or passage 40. The body 71 is only partially shown in the drawings in order to better illustrate the arrangement thereof in the passage 55. The choke opening through body 71 may be of any suitable size as desired.

When the device is to be used as a choke housing, the plug 9 will be rotated to the position illustrated in Fig. 4 so that the passage 55 therethrough will communicate with either the opening 40 or the opening 41 in plug 9. In Fig. 4 the opening 55 through plug 9 is illustrated as communicating with port or passage 40 in plug 8 and these passages in turn are communicated with access opening 50 whereby the orifice 43 and retainer plate 44 may be removed. The choke may then be inserted in opening 55 so that the annular flange 71' thereon rests on shoulder 70 of plug 8. The flow choke may be of any conventional design well known in the art, and it is believed unnecessary to give a detailed description thereof other than the general description previously given.

After the choke has been inserted the retainer ring 44 may be threaded in position against the annular flange 71' and the cap 51 replaced over the opening 50. The plugs 8 and 9 may then be rotated together so as to face the choke faces upstream in passage 3.

When the choke faces upstream, fluid flow will occur through the tubular body 71 of the flow choke.

Broadly the invention relates to a combination plug valve and orifice support wherein concentrically arranged plugs act as an orifice support and plug valve and cooperate for the easy removal or replacement of the orifices in one of the plugs.

What is claimed is:

1. A combination valve and orifice support including a body having an aperture extending longitudinally therethrough, means on each end of said body for securing it in a flow line to communicate the aperture with the flow line for flow through said body, said body having an opening extending laterally thereof and intersecting said aperture substantially mid-way between the ends thereof, inner and outer concentrically arranged plugs fitting within said opening, each of said plugs having a stem whereby they may be rotated relative to each other and relative to said body, said plugs each having openings therethrough of substantially the same size as the aperture in said body, said outer plug having orifices mounted therein for directing fluid from said aperture therethrough, there being an opening through said valve body for conducting the fluid pressure upstream of said orifice exteriorly of said body, there being an opening in said inner plug downstream of said orifice for conducting the fluid pressure exteriorly of said body whereby the pressure differential upstream and downstream of said orifice may be instrumentally noted.

2. A combination plug valve and orifice housing, including a body, there being a flow passage therethrough, telescoping inner and outer plugs rotatably fitting in said body and intersecting said flow passage, said plugs each having a stem whereby they may be rotated relative to each other and relative to said body, said outer plug having flow passages therethrough intersecting substantially at right angles either of which may be aligned with said body flow passage upon rotation of said outer plug by its stem, said inner plug having a single flow passage therethrough which may be aligned with said body and outer plug passage for conducting flow through said body and which inner plug may be rotated by its stem to shut off flow through said body.

3. A combination plug valve and orifice housing, including a body, there being a flow passage therethrough, telescoping inner and outer plugs rotatably fitting in said body and intersecting said flow passage, said plugs each having a stem whereby they may be rotated relative to each other and relative to said body, said outer plug having flow passages therethrough intersecting substantially at right angles either of which may be aligned with said body flow passage upon rotation of said outer plug by its stem, said inner plug having a single flow passage therethrough which may be aligned with said body and outer plug passage for conducting flow through said body and which inner plug may be rotated by its stem to shut off flow through said body, and orifice members adapted to be mounted in both of said flow passages in said outer plug so as to be disposed to receive flow from said body passage when either of said outer plug passages is communicated therewith.

4. A combination plug valve and orifice housing, including a body, there being a flow passage therethrough, telescoping inner and outer plugs rotatably fitting in said body and intersecting said flow passage, said plugs each having a stem whereby they may be rotated relative to each other and relative to said body, said outer plug having flow passages therethrough intersecting substantially at right angles either of which may be aligned with said body flow passage upon rotation of said outer plug by its stem, said inner plug having a single flow passage therethrough which may be aligned with said body and outer plug passage for conducting flow through said body and which inner plug may be rotated by its stem to shut off flow through said body, and orifice members adapted to be mounted in both said flow passages in said outer plug so as to be disposed to receive flow from said body passage when either of said outer plug passages is communicated therewith, said body having an access opening extending laterally relative to said flow passage whereby access may be had to either of said flow passages and orifice members in said outer plug without shutting off communication through said body.

5. A combination plug valve and orifice housing, including a body, there being a flow passage therethrough, telescoping inner and outer plugs rotatably fitting in said body and intersecting said flow passage, said plugs each having a stem whereby they may be rotated relative to each other and relative to said body, said outer plug having flow passages therethrough intersecting substantially at right angles either of which may be aligned with said body flow passage upon rotation of said outer plug by its stem, said inner plug having a single flow passage therethrough which may be aligned with said body and outer plug passage for conducting flow through said body and which inner plug may be rotated by its stem to shut off flow through said body, orifice members adapted to be mounted in both of said flow passages in said outer plug so as to be disposed to receive flow from said body passage when either of said outer plug passages is communicated therewith, said body having an access opening extending laterally relative to said flow passage whereby access may be had to either of said flow passages and orifice members in said outer plug without shutting off communication through said body, and there being an upstream and downstream opening in said flow passages relative to said orifice members for conducting the fluid pressure at such points exteriorly of said body whereby the differential pressure across said orifice may be determined.

References Cited in the file of this patent
UNITED STATES PATENTS

| | | |
|---|---|---|
| 661,175 | Haigh | Nov. 6, 1900 |
| 2,124,359 | Weisgerber | July 18, 1938 |

FOREIGN PATENTS

| | | |
|---|---|---|
| 1,080,276 | France | May 26, 1954 |